United States Patent [19]

Barrow et al.

[11] 4,410,941
[45] Oct. 18, 1983

[54] COMPUTER HAVING AN INDEXED LOCAL RAM TO STORE PREVIOUSLY TRANSLATED VIRTUAL ADDRESSES

[75] Inventors: Arthur B. Barrow, Acton; Horace H. Tsiang, North Andover, both of Mass.

[73] Assignee: Wang Laboratories, Inc., Lowell, Mass.

[21] Appl. No.: 220,902

[22] Filed: Dec. 29, 1980

[51] Int. Cl.³ .............................................. G06F 9/36
[52] U.S. Cl. .................................................. 364/200
[58] Field of Search ... 364/200 MS File, 900 MS File

[56] References Cited

U.S. PATENT DOCUMENTS 3,829,840  8/1974  Burk et al. ........................ 364/200
4,145,738  3/1979  Inoue et al. ...................... 364/200

Primary Examiner—Raulfe B. Zache

[57] ABSTRACT

A multitasking data processing machine supports virtual memory comprising a plurality of segments, and has physical memory comprising relatively fast main memory and relatively slow secondary memory. A constantly varying subset of secondary memory paged contents is copied in main memory page frames. When a memory access is required during operation of the machine, a virtual address is generated, which must be translated into a physical address, in order to address main memory. The data processing machine provides an indexed local random access memory (T/RAM) for storing previously translated addresses. The T/RAM has a capacity of one entry for each page of supported virtual memory. Before a translation is performed, the T/RAM is indexed by the virtual address; in case of a T/RAM fault, translation is performed and the translated physical address is loaded to the indexed location before restarting the memory operation. A subsequent reference to the same virtual address indexes the previously translated physical address, which is then used for addressing main memory and is also applied to index a reference/change table. A stored monitor/no monitor signal associated with each segment of virtual memory controls the storage of referenced virtual addresses for monitored segments. Upon a task switch, the stored virtual addresses are applied to index the corresponding T/RAM entries for rapid selective and partial clearing of the T/RAM.

2 Claims, 23 Drawing Figures

T/RAM ENTRY
(16 BITS)

VIRTUAL ADDRESS
(24 BITS)

PAGE TABLE ENTRY
(16 BITS)

SEGMENT DESCRIPTOR
(32 BITS)

PHYSICAL ADDRESS
(24 BITS)

COMPUTER HAVING AN INDEXED LOCAL RAM TO STORE PREVIOUSLY TRANSLATED VIRTUAL ADDRESSES

This invention relates to memory management in data processing machines.

In particular, it relates to improvements in memory management in data processing machines supporting virtual memory.

In general, in physical memory or storage structures for use in data processing machines, the cost (per unit of storage) of the memory is inversely related to the speed with which a unit of storage can be accessed. Very fast access memories are more expensive than memories which require a longer access time. As a result, in the attempt to design economical data processing machines, many machines are provided with a hierarchy of memories, in which some of the memories are slow but of large capacity, while others are fast but of small capacity. During operation of the data processing machine, the contents of the memories are transferred or copied among the memories as required.

In particular, data processing machines generally possess a "main memory", located within the machine and directly accessible by the central processor of the machine. This memory is typically composed of dynamic random access memories (RAMs).

In addition, such machines generally possess "secondary memory" (or "files"), provided on peripheral units such as magnetic tapes or disks. The access time to main memory is typically 500 nanoseconds, while the access time to a magnetic disk is typically 20 milliseconds.

Finally, such data processing machines generally possess a control store, which may be separate from the main memory or may be a write-protected part of main memory, and a very high speed cache memory, which contains a time-varying subset of the contents of main memory. The cache memory is generally located within the central processor.

If the data (which may include the macroprogram) being used by the data processing machine requires more storage than is available in the main memory, further storage is provided on the secondary memory. Before the development of virtual memory, the data was divided by the programmer into portions, called overlays, each of which fit within the main memory. Overlays were brought into the main memory one at a time, during operation of the machine; a portion of the data brought in later was written over the portion earlier brought into the main memory. The programmer was responsible for dividing his data into overlays, deciding where in the secondary memory each overlay was to be kept, keeping track of the need to bring in each new overlay, arranging for the transport of overlays between main memory and secondary memory, and, in general, managing the whole overlay process without any help from the data processing machine.

The development of virtual memory made it possible for this management to be carried on by the data processing machine, without the necessity for the programmer to control the process or even to be aware of it. According to this development, a large address space is defined, addressable by the central processor of the data processing machine, and called the virtual address space. The virtual address space may be much larger than the physical storage space available in the main memory. Data is stored in the secondary memory in blocks generally of equal size, called pages, and is transferred a page at a time to the main memory. The main memory is divided into blocks called page frames, of the same size as the pages. A page of data is stored within a page frame, aligned with its start and end.

During the operation of the data processing machine, as the need for memory access arises, signals representative of a virtual memory address are generated by the central processor. The virtual address comprises a page number which designates the page containing the necessary item, and a further address quantity, called an offset, which designates the location of the item within the page. In order to complete the memory access, the virtual address page number must be translated into a physical address page frame number, referring to the physical space in the main memory. If the data is in the main memory already, it is obtained from the physical location, and processing continues. (There may be a further step of checking to see whether the data is in the high-speed cache memory, and if it is, obtaining it directly from the cache; however, the present invention is not concerned with this further step.) If the data is not in the main memory, the data processing machine must obtain the page of data containing the necessary item from the secondary memory and put it into the main memory, after which the necessary item is obtained from the page and processsing continues.

Such a design is made practical by the fact that the logical flow of processing within the majority of programs is such that the entire program need not be resident in main memory at all times during execution of the program. For example, initialization and termination routines are executed only once during the operation of a program. Any exception-handling procedure, such as an error routine, is required only if the exception condition occurs. In other words, at any given time during the execution of the program, only a subset of the entire program need be referred to, and the elements of the subset are generally near together. This is sometimes called the "locality of reference" characteristic of programs.

The provision of virtual memory provides great advantages in memory management, freeing the programmer from the management of overlays and from concern about overrunning the available main memory of the data processing machine. In addition, a machine using virtual memory can operate with a relatively large amount of relatively inexpensive (slow) secondary memory, and a relatively small amount of relatively expensive (fast) main memory, which reduces the cost of the machine.

However, the use of virtual memory requires that operating time must be spent in executing appropriate instructions to obtain the physical address from the virtual address. The translation of the virtual address into the physical address requires access to a page table, identified by segment number and stored in main memory, which contains information regarding the location in main memory of all the pages in that segment of the currently supported virtual address space. The page table is addressed by the virtual page number, in order to locate the desired entry within the page table. Each entry in the page table includes a fault bit which indicates whether or not the page has been brought into main memory. Further, the page table entry includes protection bits and the page frame number (referring to the physical main memory) where the page resides, if it is in main memory.

The translation process therefore involves the following steps, which must be carried out by the processor (executing a microprogram) or by dedicated hardware within the processor: apply the segment number to locate the page table, apply the virtual page number to address an entry within the page table, obtain the page table entry, check the state of the fault bit, and (if the page is in main memory) combine the page frame number with the offset from the virtual address to form the physical address.

The translation process therefore takes a finite amount of time, each time that it is performed. If the process must be performed each time a memory access occurs, the memory operation of the data processing machine will be significantly slowed. It would therefore be desirable to reduce the necessary translation time.

One approach to this problem has been to provide a small buffer register, outside the central processor (in the memory controller), to store signals representative of recently translated addresses. This buffer has been designed, for example, as a set of eight to thirty-two associative registers, each containing two fields. The first field contains signals representative of the page number of a recently translated virtual storage address. The second field contains signals representative of the page frame currently assigned to the virtual storage page. Every time a virtual memory address is translated during instruction execution, signals representative of the virtual memory address page number and the resulting real memory address page frame number are placed in this buffer. A least-recently-used standard is used to select the register in which the new translation is placed (replacing an older translation).

When a memory reference, specified by a virtual address, is required in the course of operation of the data processing machine, the eight registers are searched simultaneously (in parallel). The signals representative of the virtual page number in each register are compared with the signals representative of the virtual page number of the virtual address of the current memory operation. If a match is found, the page frame number signals are taken from that register, and combined with the offset signals to form the physical address. If a match is not found, the regular translation procedure is performed.

This structure presents several disadvantages. First, although parallel searching (associative addressing) is fast, the circuitry for such searching is expensive. Further, the addressing circuitry is physically complex, and its complexity increases very rapidly with increasing number of registers to be searched. Therefore, there is in practice a sharp limitation on the possible size of the buffer, imposed by both cost and complexity. In consequence, only a very limited subset of recently translated addresses can be maintained.

In addition, in a multitasking data processing machine, the contents of the entire buffer (eight to thirty-two registers) must be cleared when the data processing machine switches tasks. This may happen very frequently. This requirement has two disadvantageous results. First, time is required to clear the buffer. Second, after the buffer has been cleared, no translated addresses are available, so that for each subsequent memory access, the buffer must be searched and then the newly translated address must be written into the buffer, until the buffer has been filled. This requires further time.

It is therefore an object of the present invention to provide means to improve the efficiency and speed of operation of a data processing machine using virtual memory, by reducing the total time required for address translation.

The invention is provided in a multitasking data processing machine which supports virtual memory comprising a plurality of segments. The data processing machine has a central processor including a latch, a memory address register, and a memory data register. A control store is connected to the central processor. A bus connected to the central processor comprises address signal lines receiving address signals from the memory address register, and data signal lines receiving data signals from the memory data register and providing data signals to the memory data register. The data processing machine provides physical memory adapted for storing data signals representative of data and macroinstructions.

The physical memory comprises relatively slow access secondary memory connected to the bus, and providing a plurality of pages of uniform size (number of bytes), each page containing a plurality of data signals, and a relatively fast access main memory connected to the bus for receiving and providing data signals and receiving address signals. The main memory provides a plurality of page frames each adapted to contain the same plurality of data signals contained by a secondary memory page, and is addressable by physical address signals comprising page frame number signals and offset signals. The central processor, control store and bus together provide means for controlling the copying of a page-sized plurality of the data signals of the secondary memory into particular main memory page frames addressed by the physical address signals, and vice versa.

The data processing machine is adapted to operate responsive to certain data signals representative of macroinstructions provided in the physical memory; the central processor and control store together are responsive to signals representative of particular read and write memory access macroinstructions to generate virtual address signals comprising segment number signals, page number signals and offset signals, and to deliver the virtual address signals to the latch. The central processor and control store are further responsive to the memory access macroinstructions to perform a translation of the virtual address signals to corresponding physical address signals. The translation comprises the application of the segment number and page number signals to the main memory to address particular portions of main memory containing page frame number signals, and the transmission of the page frame number signals from main memory, together with offset signals from the latch, to the memory address register.

The central processor and control store are further responsive to the read memory access macroinstructions to apply to the memory data register data signals from the addressed main memory page frames, and to the write memory access macroinstructions to apply to the addressed main memory page frames signals from the memory data register.

According to the invention, the data processing machine provides an indexed random access memory (referred to herein as the T/RAM, or Translation RAM) within the central processor, having its indexing means connected to certain of the outputs of the latch. There is further provided multiplexer means having its outputs connected to the inputs of the memory address register, and having two sets of inputs, the outputs of the random access memory being connected to the first set of inputs, and the outputs of the latch being connected to the second set of inputs. The central processor and control store together are initially responsive to a memory access macro instruction to apply signals representative of the virtual address page number from the latch to the random access memory indexing means to provide at its outputs the set of signals stored at the indexed location, including signals representative of the page frame number and a fault signal having one of two states.

The multiplexer means is responsive to a first state of the fault signal to transmit the indexed page frame number signals from the random access memory to the memory address register for addressing main memory, and is responsive to a second state of the fault bit to transmit the virtual address signals output from the latch to the memory address register for translation. The central processor and control store further are responsive to the second state of the fault signal to perform the translation of the virtual address signals and to apply signals representative of the translated page frame number to the indexed location in the random access memory, together with a fault signal having the first state.

According to another aspect of the invention, the central processor of the data processing machine further provides a status register comprising a plurality of settable status bits for indicating operating status of the data processing machine, and an indexed signal storage means comprising a reference and change table, providing a settable reference bit and a settable change bit for each page frame in main memory. The reference and change table is connected to the output of the indexed random access memory for indexing of the table by the page frame number. The central processor and control store together are responsive to a memory access macroinstruction to set the indexed reference bit, and to a write memory access macroinstruction to set the indexed change bit. The output of the reference and change table is connected to the status register for setting particular status bits in response to the state of the indexed reference and change bits.

According to still a further aspect of the invention, the data processing machine further provides a monitor bit in main memory associated with each virtual memory segment, and having either of two states, and a stack signal storage means in the central processor. The central processor and control means are together responsive to the second state of the fault signal and to the virtual address segment number signals, during the translation of the virtual address, to address the monitor bit for that segment and to test its state. The central processor and control means are responsive to a first state of the monitor bit to apply the virtual address page number signals to the stack signal storage means for storage.

The central processor and control means are responsive to a switch of tasks during operation of the machine to retrieve the stored virtual address page number signals from the stack signal storage means and to apply the stored signals to index the random access memory for setting the fault signal to its second state.

Other objects, features and advantages will appear from the following detailed description of the invention, together with the drawings, in which.

Figure 1:
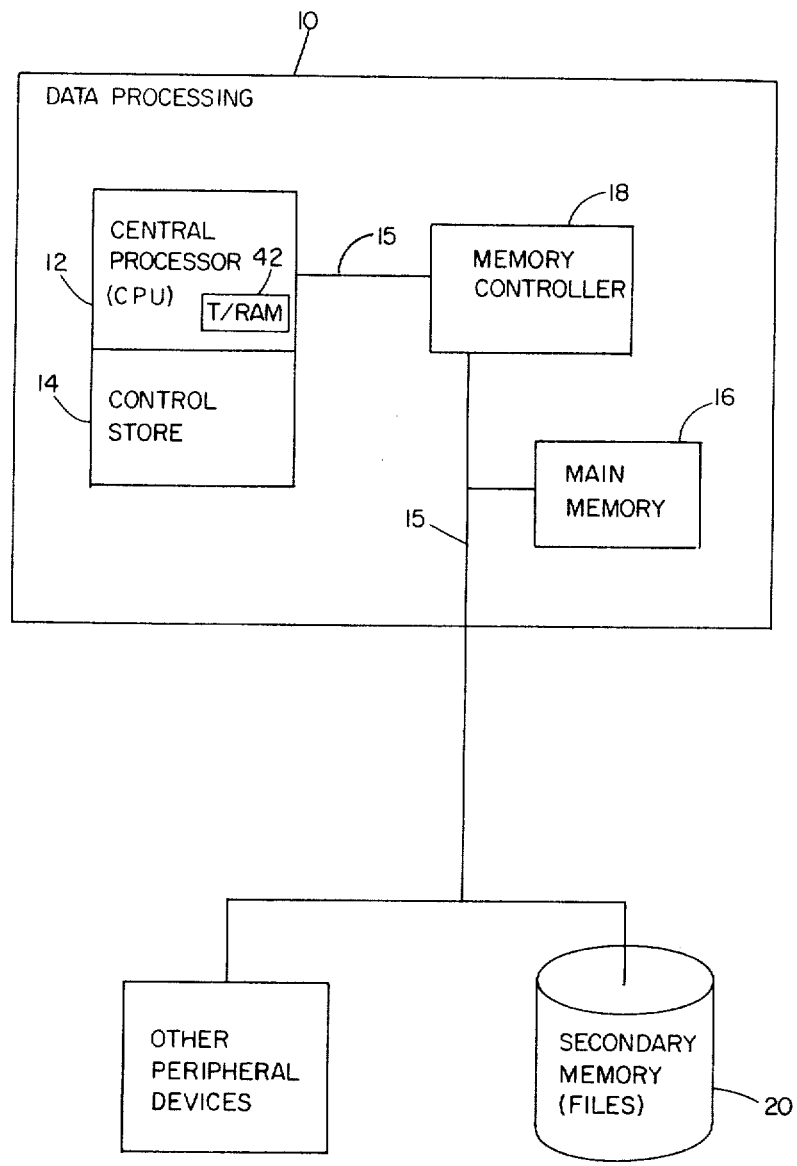
FIG. 1 is a diagrammatic view of a data processing machine incorporating the invention.

Referring now to the drawings, and in particular to FIG. 1, a data processing machine employing virtual memory is shown diagrammatically. The data processing machine 10 provides a central processor (CPU) 12 which directly accesses a control store 14, containing groups of control signals for controlling the operation of the data processing machine hardware. Particular groups of control signals are accessed in response to instructions input through peripheral devices, or in response to current conditions of operation within the central processor, all in a manner well known in the art.

Data processing machine 10 further provides a main memory 16 and a memory controller 18, whose function is to allocate memory access among the central processor and the peripheral devices. Among the peripheral devices are a secondary memory 20, and other devices such as a keyboard, CRT display, printer, telecommunications interface, and the like. Main memory 16 is addressed by the central processor through bus 15 (comprising data and address lines) and memory controller 18.

Figure 8:
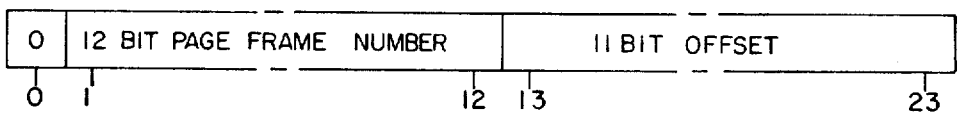
FIG. 8 shows the format of a physical address.

Main memory 16 has a capacity of 8 megabytes (8,388,608 bytes), with a word size of 32 bits (four bytes). Main memory 16 is addressed by 24 lines, providing a 24-bit physical address. The contents of main memory 16 are regarded as divided into page frames. The size of a page frame is 2K bytes. Referring to FIG. 8, the 24-bit physical address format comprises a 13-bit page frame number and an 11-bit offset specifying a byte within the page frame. (The (high-order) extra bit in the page frame number permits future expansion of the memory by a factor of two.)

The contents of the files or secondary memory 20 are regarded as divided into pages, each page being of the same size as a page frame in main memory 16, that is, 2K bytes. Data is transferred between the secondary memory and main memory in blocks, specifically in pages. The particular manner in which this is accomplished forms no part of the present invention.

Figure 2:
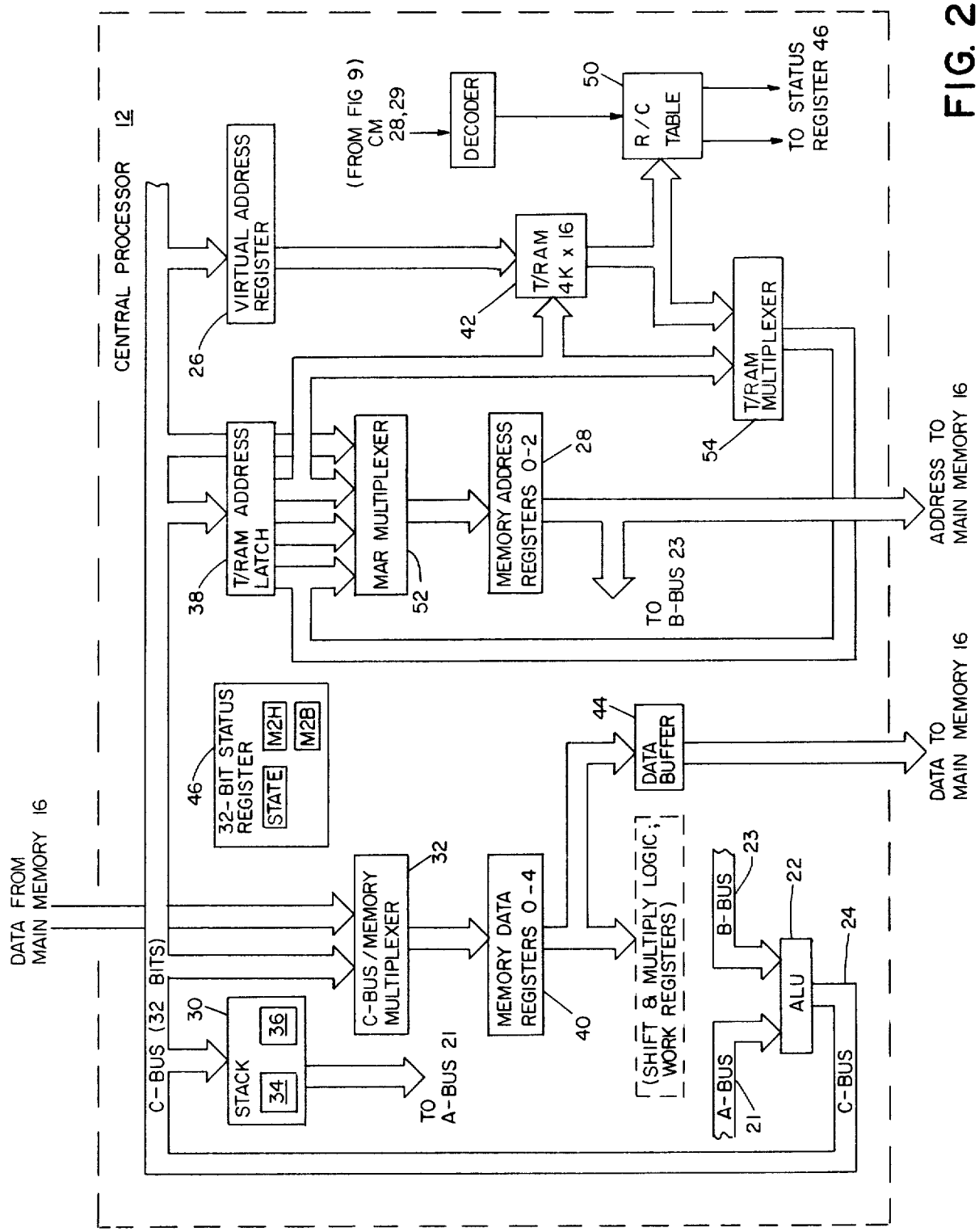
FIG. 2 is a simplified block diagram of the central processor of the data processing machine of FIG. 1.

Referring next to FIG. 2, certain elements of the central processor 12 pertinent to the present invention are shown in block diagram form in more detail than in FIG. 1. In particular, central processor 12 provides an arithmetic unit (ALU) 22 of known design, which has two 32-bit input buses, the A bus 21 and the B bus 23, and whose output is applied to a 32-bit destination bus, the C bus 24. The C-bus 24 is input, among other destinations, to a stack 30 comprising 256 32-bit registers, to a C-bus/memory multiplexer 32, to a T/RAM address latch 38, and to a 24-bit virtual address register 26. A portion of stack 30 is designated the monitor area 34, comprising registers containing 128 words of 32 bits each. As will appear in what follows, monitor area 34 is used to store a list of recently translated virtual addresses. The function of the monitor area will appear in what follows, particularly in connection with the description of FIG. 19.

Figure 7:
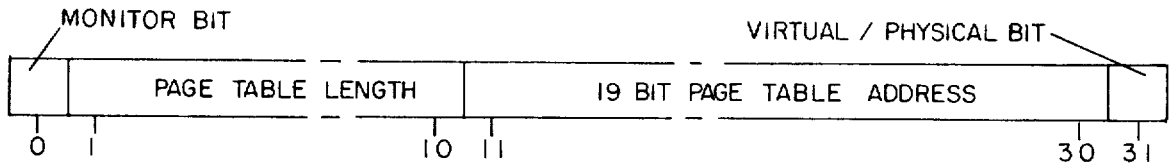
FIG. 7 shows the format of a segment control register.

A further portion 36 of stack 30 is used to store a set of signals called a table of segment descriptors. There are eight segment descriptors in the table, one for each segment of the virtual address space supported by the hardware at any one time. The format of a segment descriptor is shown in FIG. 7, and its use will be explained in connection with the description of FIG. 19.

The C bus/memory multiplexer 32 is switched by memory control signals not pertinent to the present invention to transmit either data from main memory 16 or data from C-bus 24, and the output of multiplexer 32 is applied to a set of five memory data registers (0–4) 40. The output of memory data registers 40 is either to a data buffer 44 and then to main memory 16, or to a set of work registers and shift and multiply logic, not shown in detail as their particular arrangement forms no part of the present invention.

The 32-bit Status register 46 is not connected to the A, B or C buses; its bits are individually set and sensed by the hardware of CPU 12 during operation. The particular status bits that are pertinent to the present invention are "M2H" and "M2B," which are set by the circuit of FIG. 17, in a manner to be described, and "STATE", which is input to the circuit of FIG. 14. The "STATE" bit indicates either "system state" (STATE=0) or "user state" (STATE=1); the operating system runs in system state, while all programs run in user state. Certain machine functions may be unavailable in one or the other state; the details are not relevant to the present invention.

Figure 21:
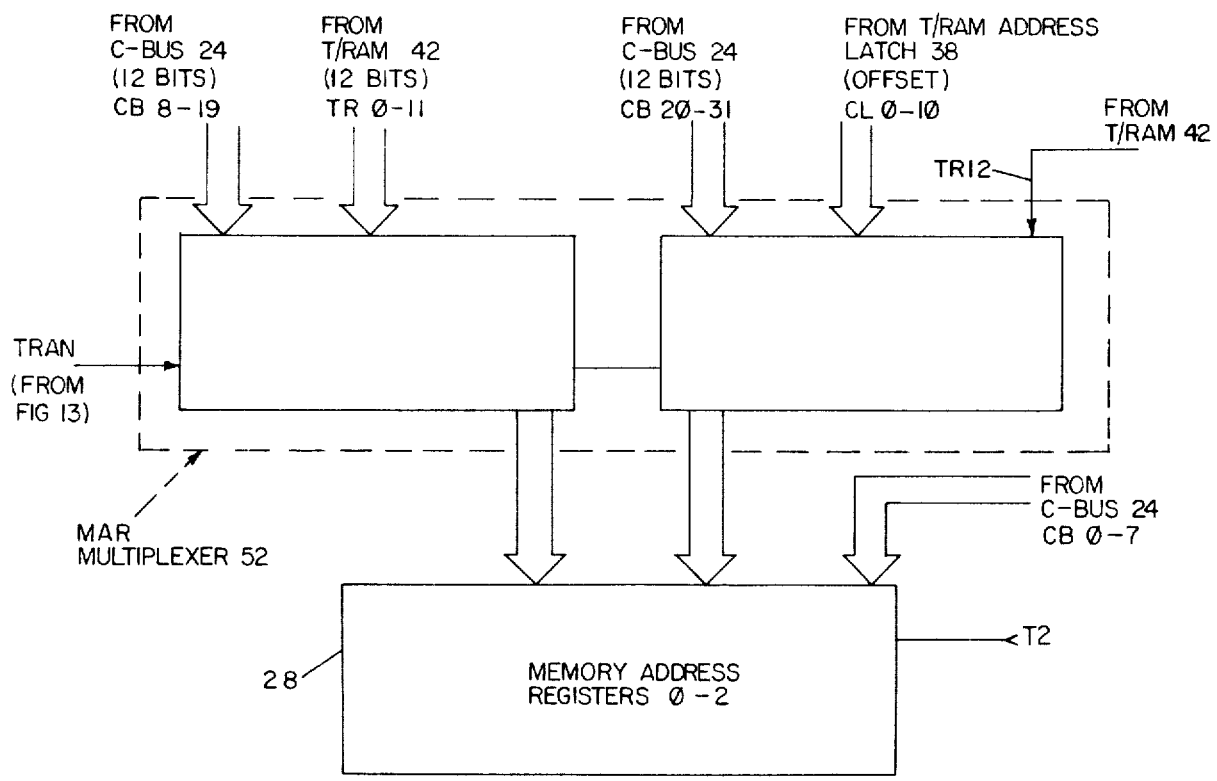
FIG. 21 shows the circuitry of the memory address register multiplexer in detail.

Main memory 16 is addressed through a set of three memory address registers (MAR 0-2) together designated by reference numeral 28. MARs 28 are loaded from MAR multiplexer 52, which is seen in more detail in FIG. 21. The three individual MAR registers are respectively of 24, 32 and 32 bits each. Individual ones of the three memory address registers are selected for the execution of different functions by CPU 12, but such selection is not pertinent to the present invention and will not be specified in what follows. The output of MARs 28 is applied to B bus 23 and to a memory address latch (not shown), from which the (physical) address signals are output to address main memory 16 in a conventional manner forming no part of the present invention.

To provide the advantages in memory management of the present invention, central processor 10 further provides a local random access memory 42, called the Translation RAM or T/RAM, holding 4K (4096) entries of 16 bits each. T/RAM 42 is indexed by twelve lines providing a 12-bit index. T/RAM 42 holds one entry per page (each page containing 2K bytes) for the entire eight megabyte virtual address space supported by the hardware at any time.

Figure 3:
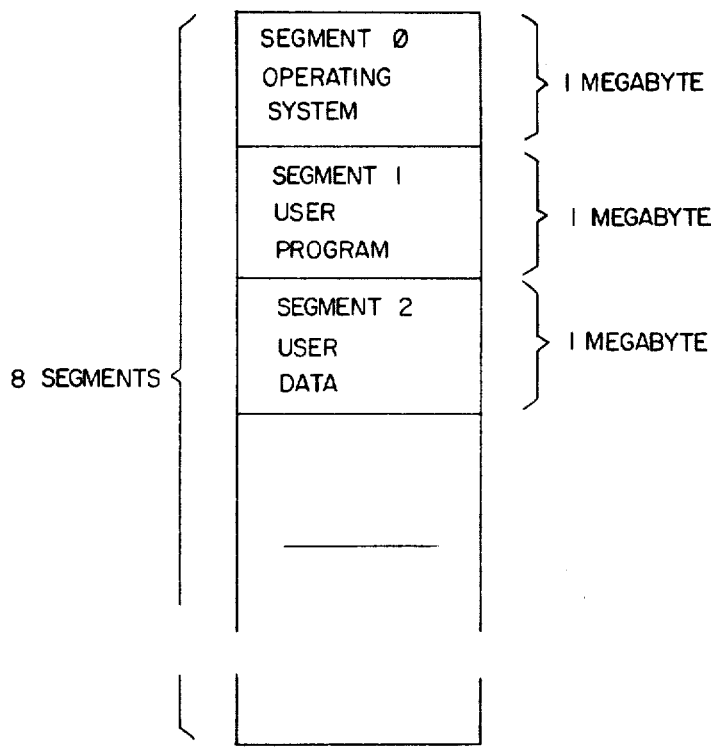
FIG. 3 is a conceptual view of the virtual address space of the data processing machine of FIG. 1.

In a multitasking data processing machine, the virtual address space may be regarded as subdivided into segments. In the particular machine described herein, the virtual address space is divided into eight segments, each of one megabyte. Referring to FIG. 3, in which the virtual address space supported by the hardware at any one time is shown conceptually, Segment 0 contains the operating system of the data processing machine, Segment 1 contains a user program, Segment 2 contains user data, and further segments are available for expansion. Each user of the machine sees an eight segment virtual address space, with the operating system in segment 0 in each such space, but with his own program and data in the remaining segments.

Figure 5:
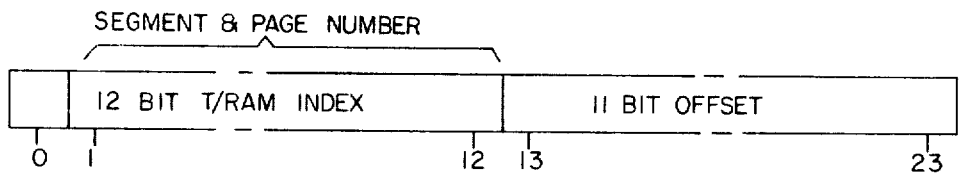
FIG. 5 shows the format of a virtual address.

The 24-bit virtual address format is shown in FIG. 5. The first (high-order) (V0) bit in the virtual address signals is an invalid bit, which in a valid 23-bit address is equal to zero; if this bit is equal to one, the address is larger than is allowed. (The 24-bit virtual address format permits future expansion of the supported virtual address space.) The state of the high-order bit V0 is tested by hardware in the machine, as will be described. Bits V1 and V12 comprise a unit called the T/RAM index. This portion of the address is logically divided into two parts, a segment number and a page number, during the operation of the central processor. However, no hardware distinction is made. The T/RAM index is translated during the process of mapping the virtual address onto a physical address, as will be described. The remaining portion of the virtual address (V13–V23) is the 11-bit offset, or location of the byte within the page. This portion of the address is not translated, being the same for the virtual and physical addresses.

To store signals in the T/RAM or to retrieve signals therefrom, the T/RAM is indexed by the twelve "T/RAM index" signals output from T/RAM address latch 38, which receives the twenty-four virtual address signals (as shown in FIG. 5) from C-bus 24. During operation of the data processing machine, the T/RAM is loaded, one entry at a time, from the virtual address register 26 in a manner to be described in what follows.

Figure 4:
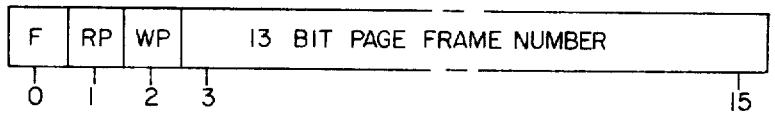
FIG. 4 shows the format of an entry in the translation RAM of the invention.

The format of a T/RAM entry is shown in FIG. 4. The entire entry comprises 16 bits; bit 0 is a Fault bit, bit 1 is a Read Protect bit, bit 2 is a Write Protect bit, and bits 3–15 comprise a page frame number. Referring again to FIG. 2, the page frame number signals of an addressed entry are read out of T/RAM 42 to the T/RAM multiplexer 54, which also receives an input from the T/RAM address latch 38. The operation of T/RAM multiplexer 54 will be discussed in connection with FIG. 16.

The page frame number portion (bits 3–15) of the output of T/RAM 42 is also applied to index Reference and Change Table 50, which contains one 2-bit entry per page frame number. The use of a reference and change table is in itself generally well known and will not be explained in detail herein. The two bits comprise a reference bit and a change bit for each page frame; the reference bit is set High to indicate a reference to that page frame in main memory; the change bit is set High to indicate that the corresponding entry in main memory has been altered. The operating system as part of its "housekeeping" operations refers to the change bit and rewrites the corresponding part of secondary memory in order to keep it consistent with main memory. The reference or change bits are set only when a translation is carried out, not on each memory reference. (The occurrence of non-translation memory references will be discussed in what follows.) Reference and change bits are reset when the page frame is reused, that is, when a different portion of secondary memory is read into that page frame of main memory, normally at a time when the data processing machine switches tasks.

So far as is pertinent to the present invention, memory address registers 28 receive inputs in two ways. First, upon the occurrence of a "T/RAM fault," to be described in what follows, the (virtual) page number signals are received from the T/RAM address latch 38. Alternatively, when the T/RAM is not faulted, the (physical) page frame number signals are received from the T/RAM multiplexer 54. In either case, the offset signals (11 low order bits) are received from the T/RAM address latch 38.

Figure 9:
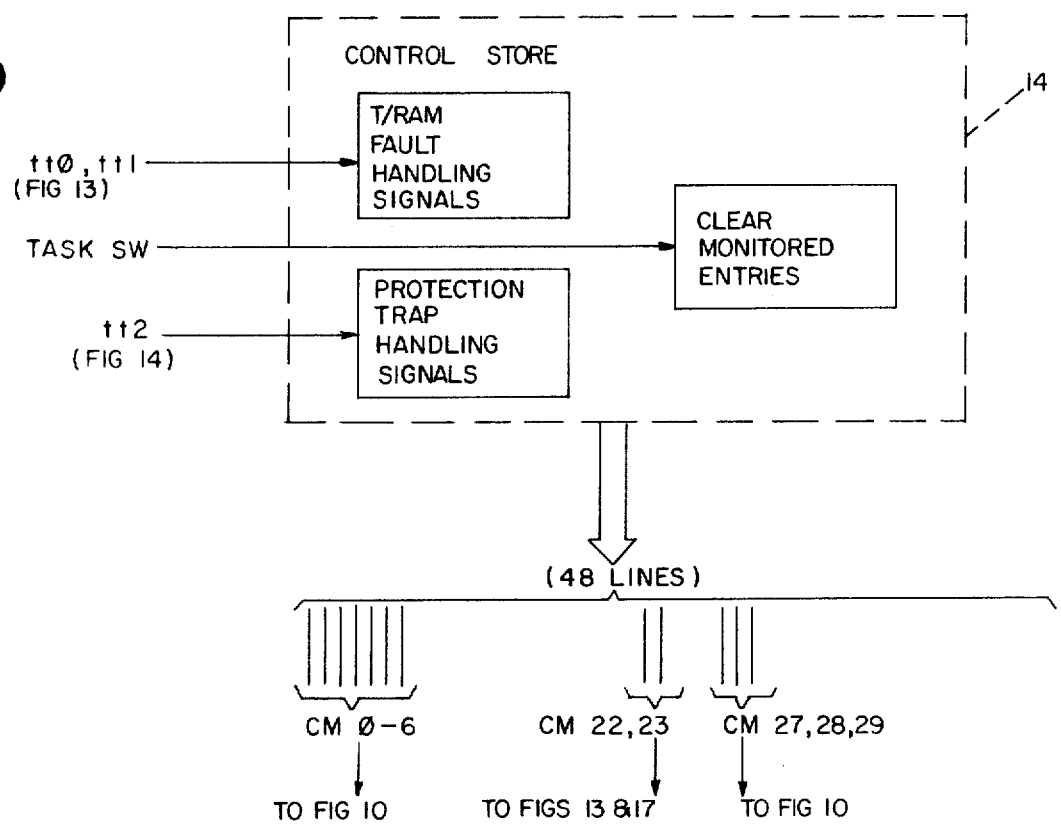
FIG. 9 shows schematically the control memory and its outputs.

Referring now particularly to FIG. 9, control store 14 contains control signals, which are accessed in groups of forty-eight signals output on forty-eight parallel lines. The signal on each line may be either High (1) or Low (0), and is applied directly to the hardware circuitry of the central processor 12 to control the operation thereof. Of the signals on the lines, only certain ones are pertinent to the present invention. These are signals 0-6, which are applied as a group to a decoding circuit (FIG. 10) to derive one of the control signals identified by the mnemonics "LT/RAM" (load entry into T/RAM), "TRCT" (test reference/change table), and "RRCT" (reset reference/change table); signals 22 and 23, which select one of the three MAR registers 28 and whose application will be mentioned in what follows; and signals 27-29, which are applied as a group to a decoding circuit (FIG. 10) to derive one or both of the translation control signals identified by the mnemonics "WT" (write-type translation operation), and "TRAN" (translate). The particular application of the derived control signals will appear in what follows.

The general manner of accessing particular groups of control signals in response to macro instructions and machine conditions forms no part of the present invention, and is well understood in the art of controlling data processing machines. The accessing of particular groups, pertinent to the present invention, will be described in what follows.

Figure 10:
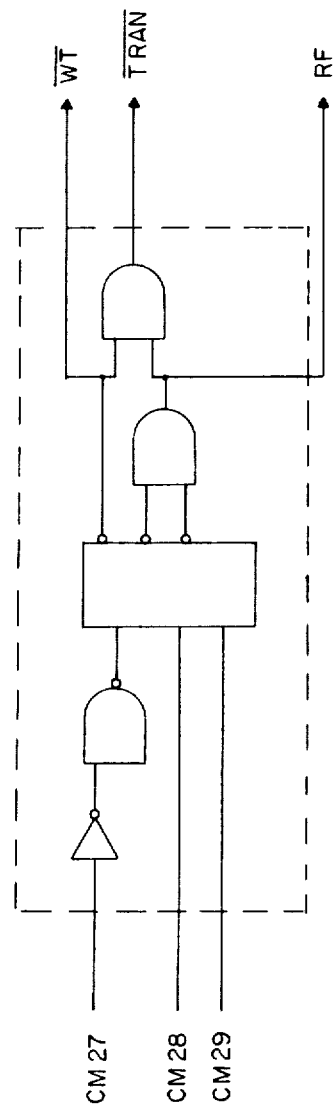
FIG. 10 shows circuitry for deriving particular control signals from certain outputs of the control memory.
Figure 10:
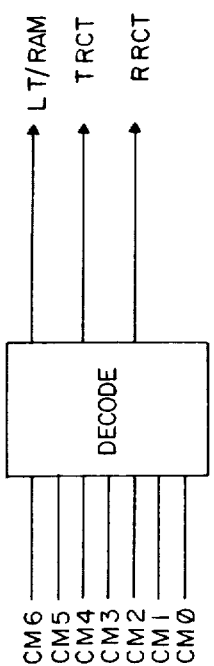
Figure 11:
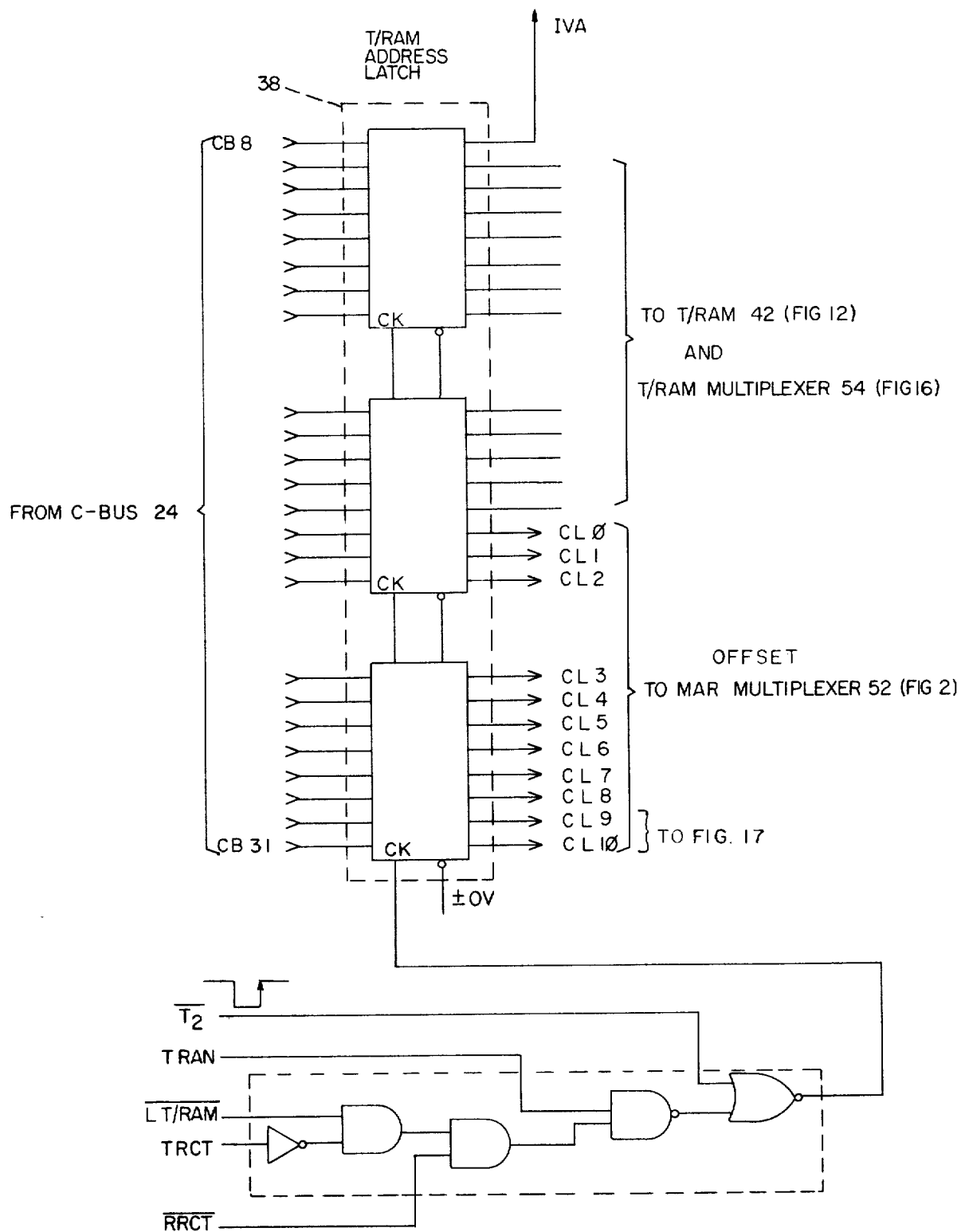
FIG. 11 shows in detail the circuitry of the T/RAM address latch.
Figures 18, 19:
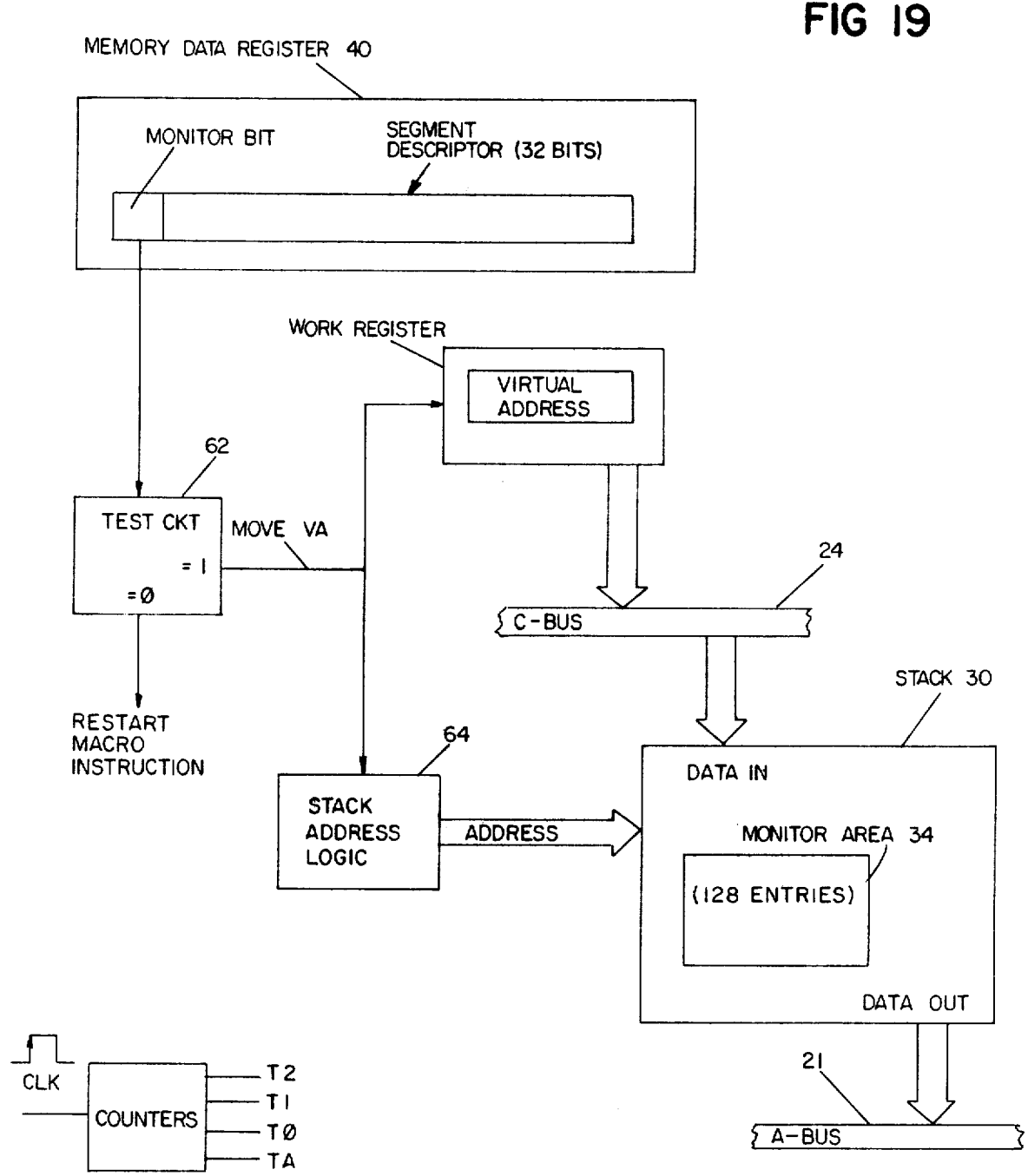
FIG. 18 shows the timing signals used to control the operations of the data processing machine.
FIG. 19 shows in detail elements of the central processor related to the monitor function.

Referring now to FIG. 11, the circuitry of T/RAM address latch 38 is shown in detail. Bits 8-31 from the 32-bit C-bus 24, comprising the 24-bit virtual address, are input to latch 38. Latch 38 is controlled by a signal input at "CK" which comprises a control signal and a clock signal; the control signal is one of those designated TRAN, LT/RAM, TRCT, or RRCT, whose derivations are shown in FIG. 10, while the clock signal is "T2" (FIG. 18). When clocked, the latch transmits bits 0-13, comprising the V0 bit ("IVA") and the 12-bit T/RAM index (see FIG. 5) of the virtual address. The remaining outputs of latch 38 comprise the 11-bit offset (see FIG. 5) and are applied to MAR multiplexer 52.

Figure 12:
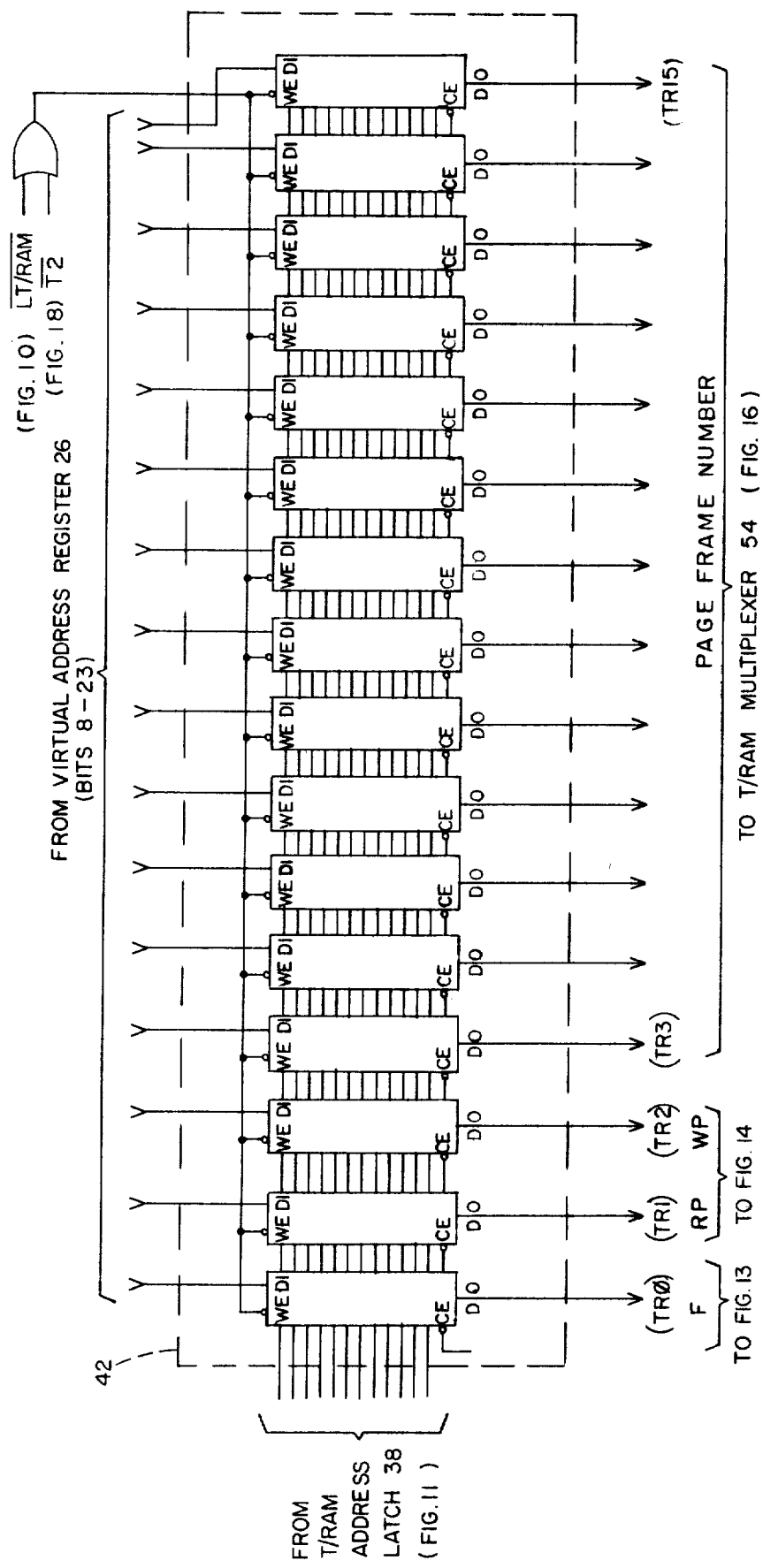
FIG. 12 shows in detail the circuitry of the T/RAM.

Referring next to FIG. 12, the circuitry of T/RAM 42 is seen in detail. The twelve T/RAM index bits from latch 38 (FIG. 11) are applied to index the T/RAM for either input or output. Signals representing a T/RAM entry may be applied to the T/RAM at the data in ("DI") ports from virtual address register 26 upon application of the control signal "LT/RAM" (from the circuit of FIG. 10) together with clock signal T2 (FIG. 18). The signals are stored at the indexed location. Signals representative of the indexed entry are output at the data out ("DO") ports and bits 3-15 (representing the page frame number) are applied to T/RAM multiplexer 54 (FIG. 16), whose operation will be described.

Figure 13:
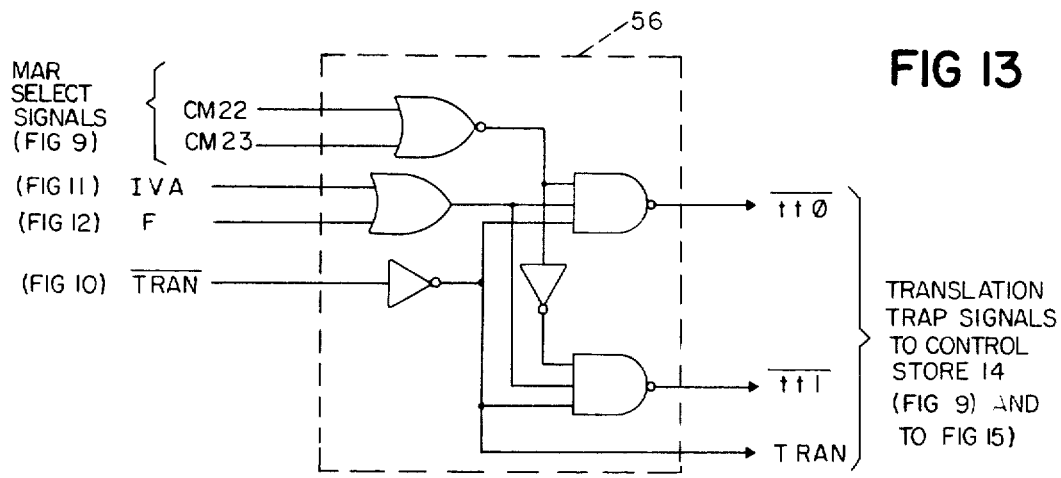
FIGS. 13, 14 and 15 show circuitry for deriving particular control signals.

Referring now to FIG. 4, the signals stored as a T/RAM entry comprise the Fault bit (F), Read Protect (RP) and Write Protect (WP) bits, and a 13-bit page frame number. As seen in FIG. 12, these 16 signals are output at the data out (DO) ports of T/RAM 42. Referring to FIG. 13, the Fault bit, together with the "IVA" bit from T/RAM address latch 38 (FIG. 11), the control signals CM 22 and 23 from control store 14 (MAR select signals), and TRAN (from FIG. 10), are applied to translation trap logic circuit 56, which generates one of two possible trap signals, TT0 and TT1. These are both translation traps; the distinction between them depends upon which of the memory address registers is to receive the address signals, which is not pertinent to the present invention.

Figure 14:
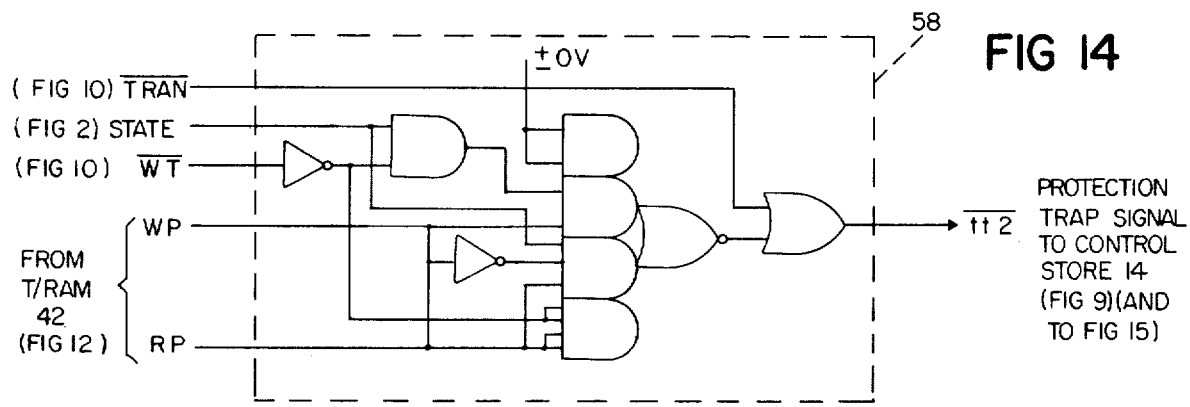

Referring to FIG. 14, the WP and RP bits from T/RAM 42 are applied, together with the STATE status bit (FIG. 2) and the WT and TRAN control signals (from FIG. 10) to a protection trap logic circuit 58. This circuit generates a trap signal TT2. The use of protection bits is in general well known and will not be described herein.

Figure 15:
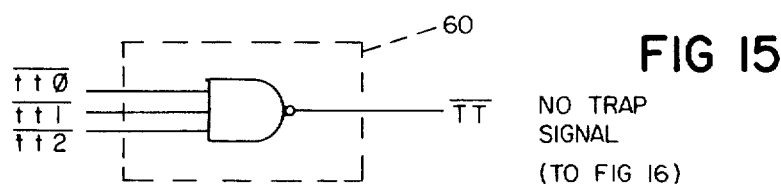

The three trap signals are applied to the circuit 60 of FIG. 15, which, if no trap signal is generated (i.e., there is neither a T/RAM fault nor a protection fault) generates a "no trap" control signal TT. The further function of the three trap signals will be described in what follows.

Figure 16:
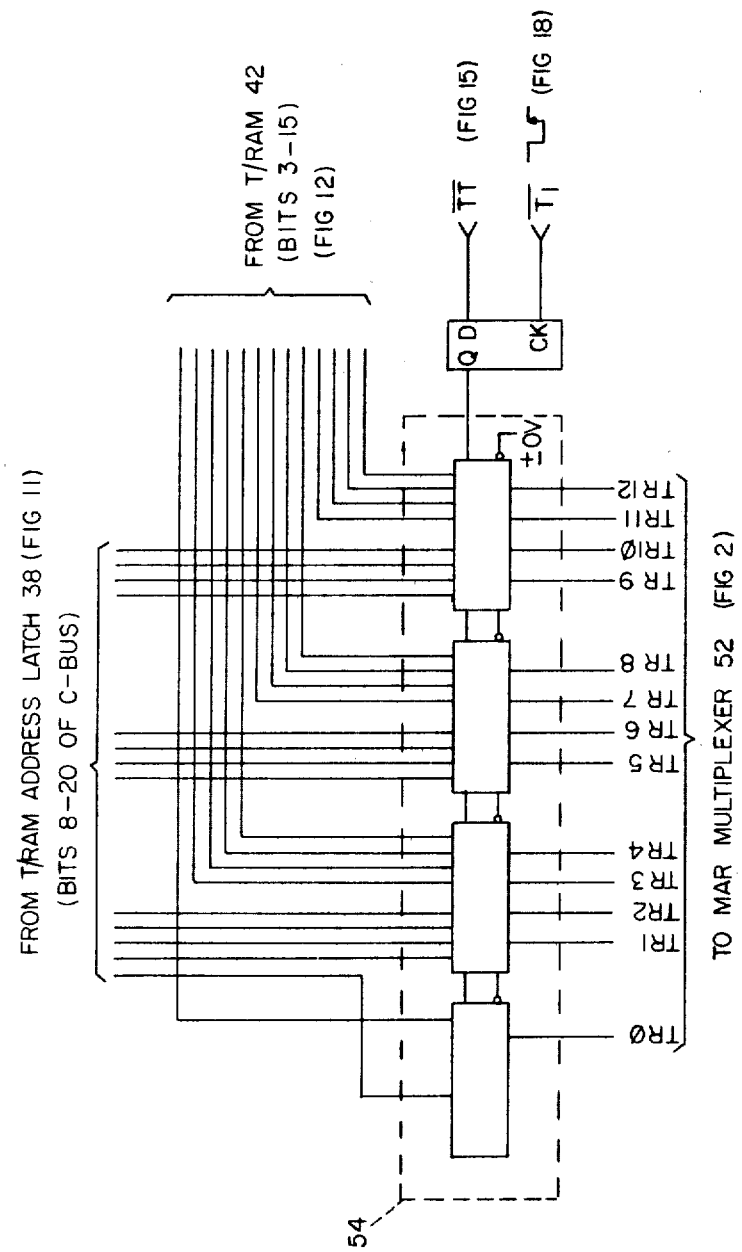
FIG. 16 shows the circuitry of the T/RAM multiplexer in detail.

Referring now to FIG. 16, the control signal TT is applied, together with clock signal T1, to T/RAM multiplexer 54 to select one of its two inputs (each input being a set of lines). If there are no traps, the 13-bit page frame number portion of the T/RAM entry read out of T/RAM 42 (physical address) is transmitted by multiplexer 54 on lines TR 0-12 to MAR multiplexer 52 (FIG. 2). Alternatively, in the case of a trap, C-bus bits 8-20 (virtual address) are transmitted on lines TR 0-12 to MAR multiplexer 52.

Figure 17:
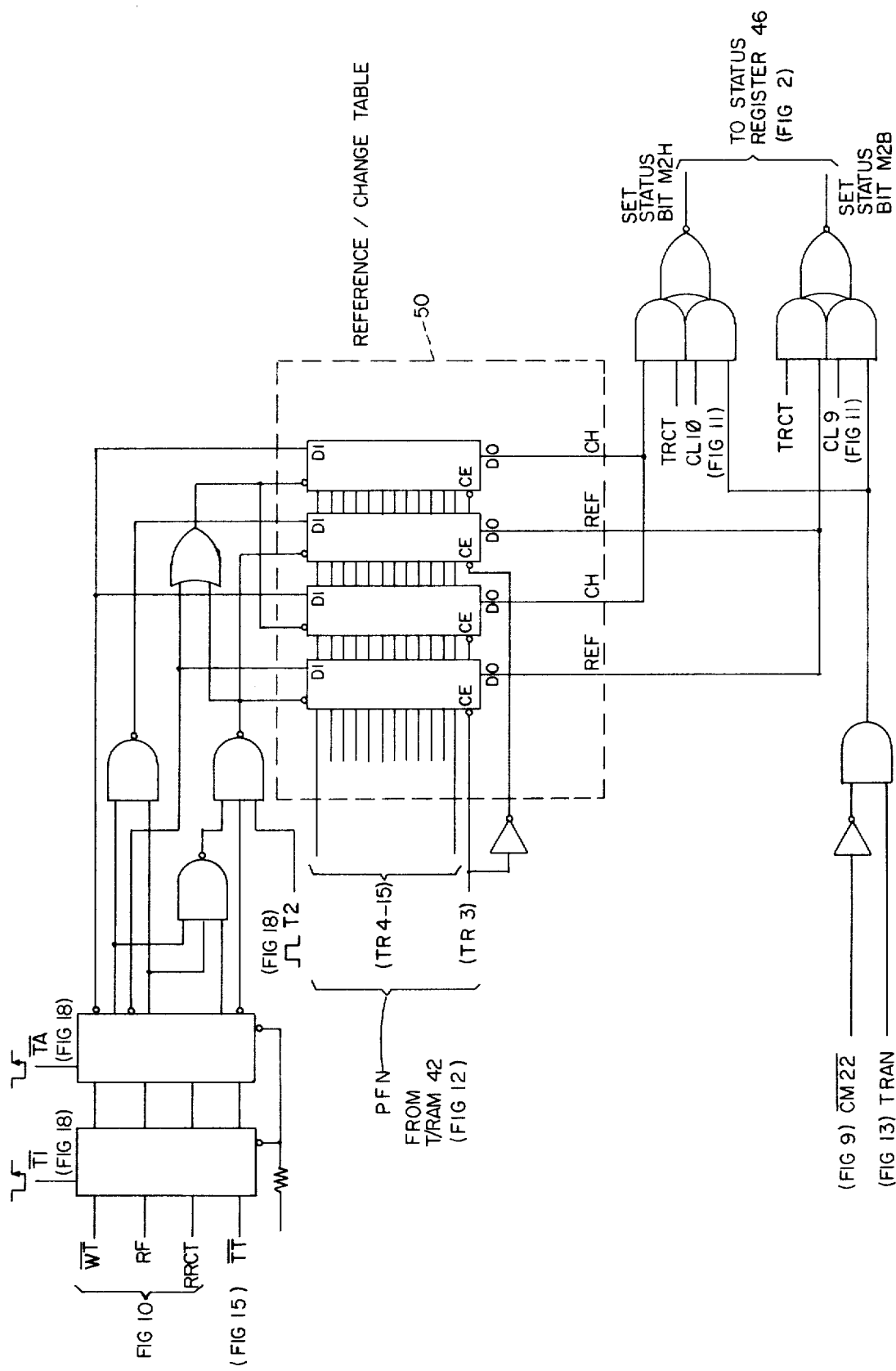
FIG. 17 shows the circuitry of the reference/change table in detail.

Referring now to FIG. 17, the reference/change table 50 is shown in detail. The control signals which control the operation of this table are identified by the mnemonics WT (write-type translation operation), RRCT (reset reference/change table), RF (set reference bit), and TRCT (test reference/change table), all from FIG. 10; TRAN (translate), from FIG. 13; TT (no traps) from FIG. 15; CM 22 (one of the MAR select control signals) from FIG. 9; and CL 9 and CL 10, which are outputs from T/RAM latch 38 (FIG. 11). Clock signals T1 and TA (FIG. 18) further control the operation of reference/change table. The signal RRCT resets the 2-bit entry, indexed by T/RAM bits 3-15, to "00" (both bits are set Low). The signal RF sets the "reference" bit of the indexed entry High. The signal WT with TT sets the "change" bit of the indexed entry High. The use of the page frame number from T/RAM 42 to index reference/change table 50 provides increased speed and efficiency of operation of the data processing machine.

The signal TRCT causes the status bits "M2H" and "M2B" in status register 46 (FIG. 2) to be set to the values of the reference and change bits of the addressed entry. The status bits are later tested by the operating system in order to determine what portions of secondary memory need to be rewritten to keep them consistent with the contents of main memory. This procedure is well known in the art of operating data processing machines, and forms no part of the present invention.

Referring to FIG. 9, the trap signals tt0, tt1, and tt2 are seen to access particular groups of control signals stored in the control store. The details of particular control signals to carry out the indicated functions will depend upon the detailed structure of the machine in which they are to be used, and it is within the skill of designers of data processing machines to select such particular signals. Therefore, this aspect of the operation of the machine will be described generally, without giving details of the control signals, with the exception of the signal required to load the T/RAM.

Generally, the T/RAM fault handling group of control signals controls the CPU to copy from portion 36 of stack 30 (table of segment descriptors) into one of memory data registers 40 signals representative of a particular segment descriptor indicated by the segment portion (high order three bits) of the T/RAM index of the virtual address signals, which have been transferred to a work register from Memory Address Registers 28 via B-Bus 23.

Referring to FIG. 7, each segment descriptor comprises 32 bits, of which bit 0 is called the "monitor bit," whose use will be explained; bits 1-10 represent the length of the page table for the segment; bits 11-30 represent the address of the page table for the segment; and bit 31 is a "virtual/physical" bit, indicating whether the address is virtual or physical. If the page table address is physical, the address need not be translated; if virtual, it must be translated before proceeding.

Figure 6:
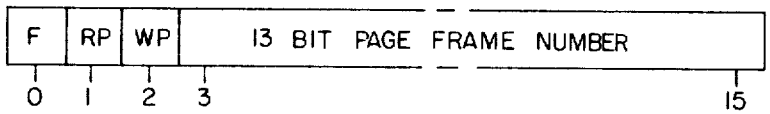
FIG. 6 shows the format of a page table entry.

The page table address portion of the segment descriptor signals is used to address the page table, in main memory 16. The format of a page table entry is shown in FIG. 6, and is seen to be identical with that of a T/RAM entry. The particular page table entry within the page table is addressed by using the page portion of the T/RAM index portion (bits V1- V13) of the virtual address signals (now in a work register). The signals representative of the addressed page table entry are brought from main memory into virtual address register 26. The fault bit of the PTE is tested. If the fault bit = 1, the page is not in memory, and must be brought in by conventional means, and the fault bit reset to 0. If the fault bit = 0, the control signal LT/RAM (FIG. 10) loads the page table entry signals into the T/RAM at the indexed location together with a fault bit set to 0, and protection bits whose state is determined in a manner not pertinent to the present invention.

Referring to FIG. 19, the "monitor bit" of the segment descriptor signals is tested by circuit 62. If the monitor bit is found to be Low the interpretation of the macro instruction is restarted. If the monitor bit is found to be High, a control signal "MOVE VA" is output which causes the virtual address signals to be applied from the work register to stack 30. Stack address logic 64 addresses a location within monitor area 34 of the stack; the virtual address signals are stored within the monitor area. Up to 128 virtual addresses may be stored in the monitor area. A count is kept and is employed by stack address logic 64 in loading further virtual addresses. After the virtual address signals have been stored in monitor area 34, interpretation of the macro instruction is restarted.

The virtual address signals stored in monitor area 34 are available for use in clearing particular entries in T/RAM 42. This may be accomplished in various ways, depending upon operating conditions not pertinent to the present invention. In particular, when the data processing machine switches from one task to another, monitored entries are cleared by the operating system in connection with other "housekeeping" operations performed in connection with task switching, and not otherwise pertinent to the present invention. Referring to FIG. 9, a "task switch" signal (from the operating system) accesses particular control signals within the control store in order to clear the monitored entries.

Figure 20:
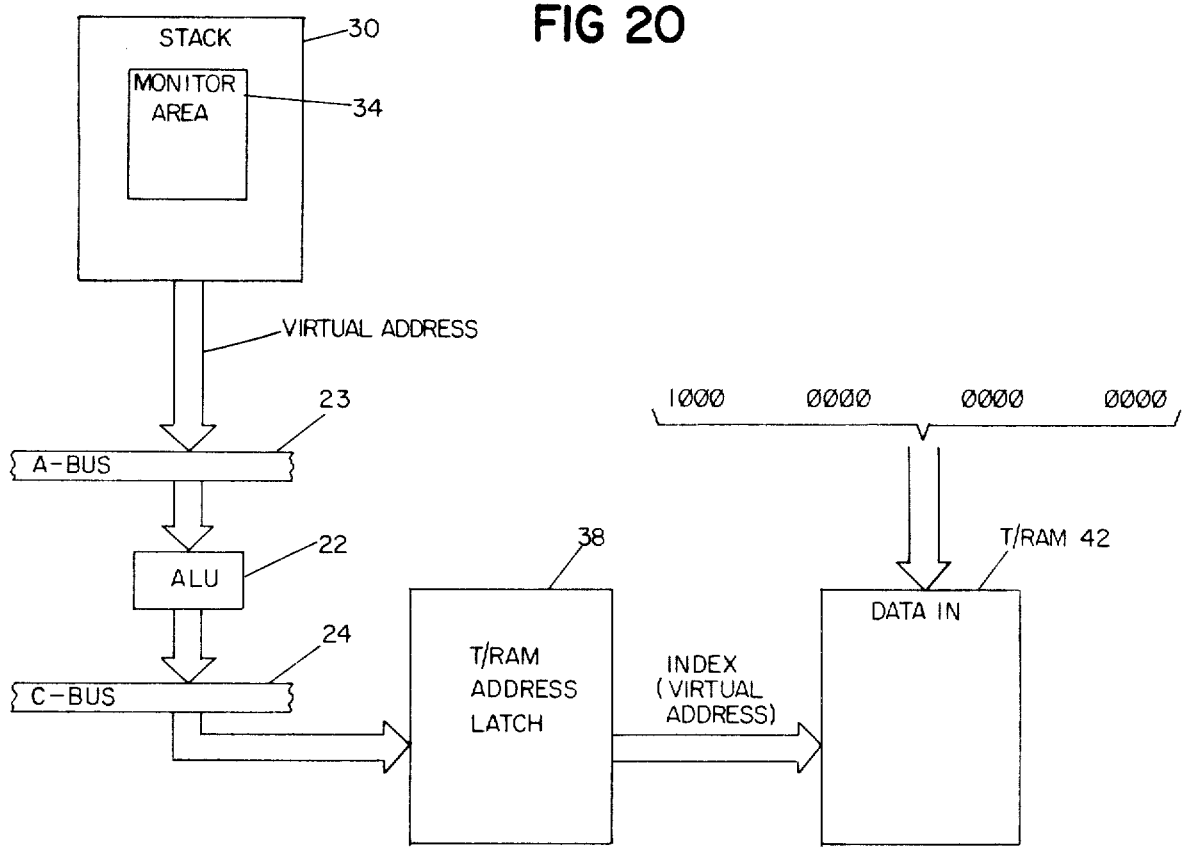
FIG. 20 is a conceptual showing of the process of clearing monitored entries in the T/RAM.

During clearing of a T/RAM entry, as seen in the conceptual view of FIG. 20, the virtual address signals stored in monitor area 34 of stack 30 are applied to the T/RAM address latch 38, to index the particular entry to be cleared. The high-order (fault) bit of the entry is set High, and the remaining bits are set Low at the indexed location to clear the entry. By using the addresses from the monitor area, the particular monitored entries can be quickly cleared without the necessity of clearing the entire T/RAM. At the same time, entries that are not monitored (such as signals representative of addresses to the operating system segment) remain in the T/RAM and need not be cleared or reloaded on the next memory access. This saves further operating time.

For example, consider the usage of Segment 1 of the virtual address space (FIG. 3). When operating of the data processing machine begins, there are no valid entries in the T/RAM for the Segment 1 virtual address space. The operating system initially loads the segment descriptor for Segment 1, with M = 1 (indicating monitoring; see FIG. 7). The task which uses Segment 1 then begins.

Suppose that the execution of this task involves memory references to nine pages of Segment 1 before the task is interrupted. As each of these pages is accessed, its virtual address is translated by reference to the segment descriptor and page table; on each reference, the state of the monitor bit is noted, and as each physical address is stored in the T/RAM, the virtual address is stored in monitor area 34. When the task is interrupted, the Segment 1 T/RAM entries must then be cleared. In this example, there will be at this point nine virtual addresses stored in the monitor area 34 of Stack 30. Therefore, only these nine T/RAM entries need be cleared. In operation, the translation function is invoked during the operation of CPU 12 in response to a macro instruction, that is, an instruction that forms part of a program being executed by the data processing machine. CPU 12 interprets each macro instruction, and the hardware elements of CPU 12 operate according to the interpretation to carry out the operation specified. Such hardware interpretation of macro instructions is generally well understood in the art and the details form no part of the present invention, except as hereinafter described.

In the course of interpreting the macro instruction, if CPU 12 recognizes that a memory access operation is specified, in response CPU 12 accesses particular control signals from control store 14, including particular signals on lines CM 27–29 (FIG. 10).

Not every access to memory requires a translation operation. Frequently, successive memory operations are to contiguous locations in memory, and rather than generate an entire 23-bit address for each successive memory operation, it is possible by incrementing or decrementing an address already generated (and already present in MARs 28) to specify the location for the next memory operation. Such incrementing or decrementing steps are referred to as "ripple" operations, and in the machine herein described, the "ripple" function is specified by combinations of the control signals on lines CM 27–29, other than those shown in FIG. 10. The selection of "ripple" or "translate" groups of control signals within the control store is controlled by other aspects of the interpretation of macro instructions by CPU 12, not pertinent to the present invention.

If the next physical address is to be determined by translation, rather than by a "ripple," then, depending on whether a read or write operation is involved, the signals output on the three lines CM 27–29 control either a "read main memory with translation" operation (RTRAN) or a "write main memory with translation" operation (WTRAN). Two kinds of "RTRAN" operation are provided, depending upon certain operating conditions not pertinent to the present invention.

The group of control signals including the RTRAN or WTRAN combination of signals on lines CM 27–29 also includes C-bus destination control signals, which cause the signals representative of the virtual address at which the memory access is to be made to be placed on C-bus 24 and applied from C bus 24 to virtual address register 26 and to T/RAM address latch 38. The control signal TRAN latches the T/RAM index portion of the virtual address signals from T/RAM address latch 28 to T/RAM 42. The indexed T/RAM entry entry signals output at the data out ports of T/RAM 42. The Fault and Protect bits (TR 0–TR 2) are applied to the trap circuits of FIGS. 13 and 14, while the page frame number bits (TR 3–15) are applied to T/RAM multiplexer 54 (FIG. 16). In the absence of traps, "no-trap" signal TT switches multiplexer 54 to transmit the page frame number signals to MAR multiplexer 52 (FIG. 2), which transmits them, together with the offset signals (V14–23), to MARs 28, forming the set of signals representative of the physical address. The indexed entry in reference/change table 50 is updated at this time.

Alternatively, if there is a T/RAM fault, Fault bit (TR 0) input to circuit 56 of FIG. 13 causes a translation trap signal tt0 or tt1 to be generated. The output of circuit 60 (FIG. 15) switches multiplexer 54 to output the T/RAM address signals from C-bus 24 to MAR multiplexer 52. The translation trap signal accesses a particular group of control signals in control store 14 which cause a segment descriptor in the table 36 in stack 30 to be used to locate in main memory 16 the page table for the segment. The page table entry is found in the segment page table, and the particular decoded control signal LT/RAM (FIG. 10) causes the page table entry signals to be loaded into T/RAM 42 (FIG. 12), from V MAR 26, at the location indicated by the T/RAM index signals from T/RAM address latch 38. The Monitor bit of the segment descriptor is tested by circuit 62, and if it is High, the virtual address signals are stored in the Monitor Area 34 of Stack 30 for use in selective clearing of the T/RAM entry at a later time.

The interpretation of the macro instruction is then restarted. The WTRAN or RTRAN control signals are again applied to the circuit of FIG. 10, and the signals of the indexed entry are read out from T/RAM 42. This time, the Fault bit=0, permitting the translated page frame number signals to be placed in MARs 28 in order to carry out the read or write operation specified by the macro instruction. The reference/change table 50 is updated at the location indexed by the page frame number signals (FIG. 17) at this time.

If there is a protection fault, detected by circuit 58 of FIG. 14, protection trap signal tt2 accesses particular control signals within control store 14 (FIG. 9) to cause appropriate operation of CPU 12, in a manner not pertinent to the present invention.

Figure 22:
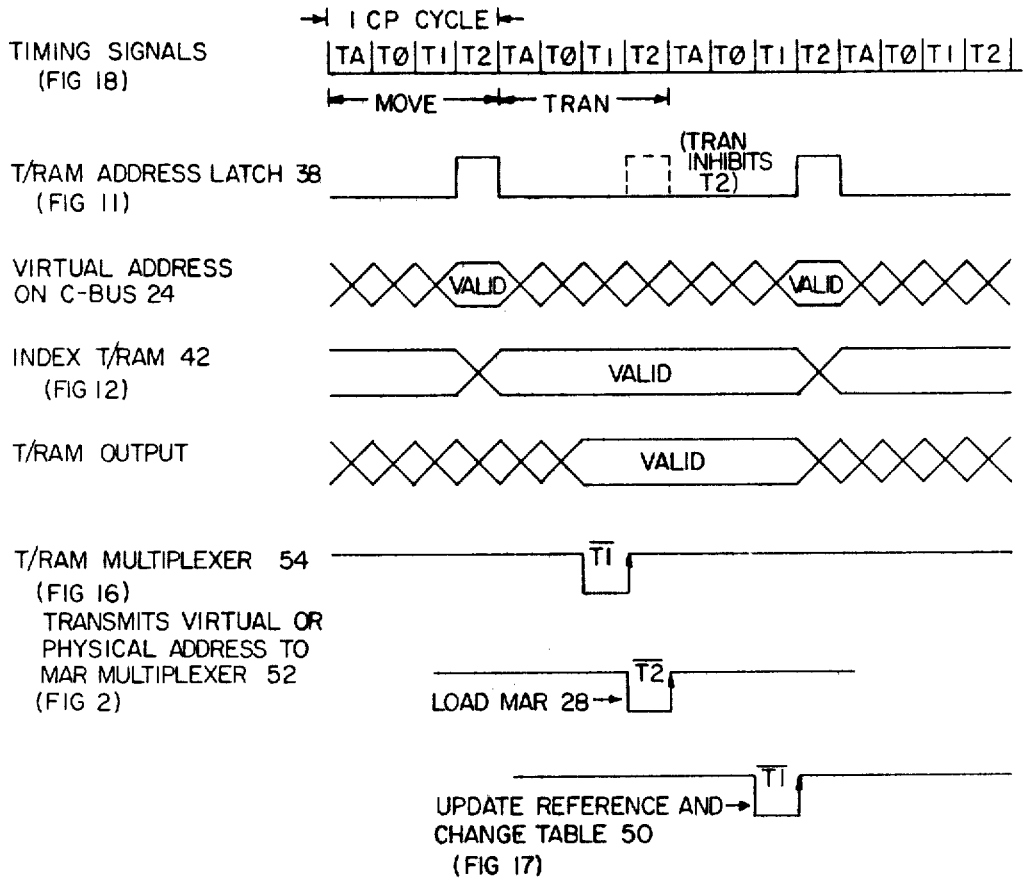
FIGS. 22 and 23 show the timing of accessing the T/RAM and loading an entry into the T/RAM according to the invention.

The timing of the indexing of T/RAM 42 is shown in FIG. 22. As seen in this Figure, one central processor (CP) cycle comprises the four timing intervals TA, T0, T1, and T2 (these signals are generated as seen in FIG. 18). Each translation operation requires two CP cycles, one "MOVE" and one "TRAN." The timing is the same whether or not there is a T/RAM fault.

Timing signal T2 is input to T/RAM address latch 38 (FIG. 11) to latch the virtual address signals from C bus 24 to index the T/RAM 42. The F, WP and RP bits of the T/RAM output are applied to the circuits of FIG. 13 and 14 to generate trap signals, and the output of circuit 60 (FIG. 15) is applied, with timing signal T1, to T/RAM multiplexer 54. In case of a T/RAM fault, the virtual address signals are transmitted to MAR multiplexer 52; otherwise the page frame number (physical address) signals are transmitted. The output of MAR multiplexer 52 (FIG. 23) is loaded into MARs 28 at T2. Finally, the reference and change table 50 is updated at the next T1 (if no T/RAM fault).

Figure 23:
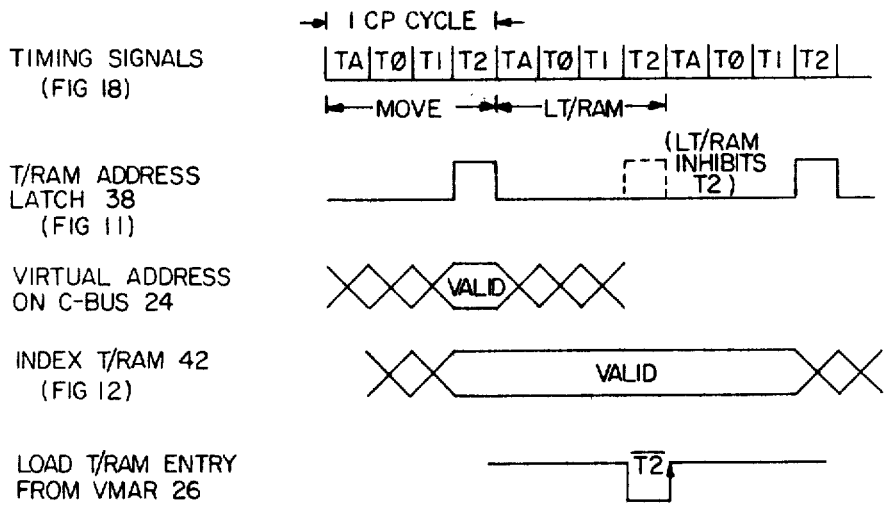

As has been described, in case of a T/RAM fault a trap signal is applied to control store 14 to access the appropriate control signals for handling the fault. One of the signals derived from those thus accessed is LT/RAM (load T/RAM, FIG. 10) which, as has been described, causes page frame number signals to be loaded into the T/RAM. The timing of the loading of one entry into T/RAM 42, after a T/RAM fault, is shown in FIG. 23.

After the data processing machine has executed some portion of a first user's program, it switches to executing the program of another user. This will ordinarily mean that new data will be brought from the files (secondary memory 20, FIG. 1) into main memory. A page table (for each segment of the second user's virtual address space) is constructed by the operating system to record the particular page frames in main memory into which particular pages of secondary memory are written. These page tables will be used for translating virtual into physical addresses for the virtual memory as seen by the second user. The page tables for the former user's system are no longer valid (since the second user's program or data may now be located in page frames formerly used by the first user), and entries in the T/RAM that refer to the first page tables must be invalidated.

The operating system responds to this task switch by carrying out a number of "housekeeping" operations, including the activation of the new page tables by bringing in new segment descriptors from main memory to portion 36 of stack 30, to point to the page tables. In the course of such operations, the operating system clears the monitored entries from the T/RAM, as shown in FIG. 20, making use of the virtual addresses stored in the monitor area 34 of stack 30 in the manner that has been described. However, not all entries in the T/RAM are invalid; those that refer to the operating system segment (segment 0) remain valid. Such operating system parts are, for example, a scheduler module, a pager module, file management services, or data base management services. In such cases, the segment descriptor for the segment containing the module would have a monitor bit set Low, and as a result, no virtual addresses in this segment would be stored in the monitor area 34. Therefore none of the T/RAM entries for this segment would be cleared upon a task switch. According to the invention, only the entries from the page table for a monitored segment are invalidated when a new task is activated.

Various modifications of the invention, within the spirit thereof and the scope of the appended claims, will occur to those skilled in the art.

What is claimed is:

1. In a multitasking data processing machine supporting virtual memory comprising a plurality of segments, said data processing machine having a central processor including a latch, a memory address register and a memory data register, a control store connected to said central processor, a bus connected to said central processor, comprising address signal lines receiving address signals from said memory address register, and data signal lines receiving data signals from said memory data register and providing data signals to said memory data register, physical memory adapted for storing data signals representative of data and macroinstructions, comprising relatively slow access secondary memory connected to said bus, and providing a plurality of pages, each page containing a plurality of said data signals, and relatively fast access main memory connected to said bus for receiving and providing data signals and receiving address signals, said main memory providing a plurality of page frames each adapted to contain the same plurality of data signals contained by a said secondary memory page, and addressable by physical address signals comprising page frame number signals and offset signals, said central processor, control store and bus together providing means for controlling the copying of a page-sized plurality of the data signals of said secondary memory into addressed said main memory page frames and vice versa, said data processing machine being adapted to operate responsive to certain of said data signals representative of macroinstructions provided in said physical memory, said central processor and control store together being responsive to signals representative of particular read and write memory access macroinstructions to generate virtual address signals comprising segment number signals, page number signals and offset signals, and to deliver said virtual address signals to said latch, said central processor and control store being further responsive to said memory access macroinstructions to perform a translation of said virtual address signals to corresponding physical address signals, said translation comprising the application of said segment number and page number signals to said main memory to address particular portions of main memory containing page frame number signals, and the transmission of said page frame number signals from said main memory, together with said offset signals from said latch, to said memory address register, said central processor and control store being further responsive to said read memory access macroinstructions to apply to said memory data register data signals from said addressed main memory page frames, and to said write memory access macroinstructions to apply to said addressed main memory page frames signals from said memory data register, that improvement comprising an indexed random access memory within said central processor, having its indexing means connected to certain of the outputs of said latch, multiplexer means having its outputs connected to the inputs of said memory address register, and having two sets of inputs, the outputs of said random access memory being connected to the first said set of inputs, the outputs of said latch being connected to the second said set of inputs, said central processor and control store together being initially responsive to a said memory access macroinstruction to apply signals representative of said virtual address page number from said latch to said random access memory indexing means to provide at its outputs the set of signals stored at the indexed location, including signals representative of said page frame number and a fault signal having one of two states, said multiplexer means being responsive to a first state of said fault signal to transmit the indexed page frame number signals from said random access memory to said memory address register for addressing main memory, and responsive to a second state of the fault signal to transmit the virtual address signals output from said latch to said memory address register for translation, said central processor and control store further being responsive to the second state of said fault signal to perform said translation of said virtual address signals and to apply signals representative of said translated page frame number to said indexed location in said random access memory, together with a said fault signal having said first state, said central processor further providing a status register comprising a plurality of settable status bits for indicating operating status of said data processing machine, an indexed reference and change table providing a settable reference bit and a settable change bit for each said page frame in said main memory, said reference and change table being connected to the output of said indexed random access memory for indexing of said table by said page frame number, said central processor and control store together being responsive to a said memory access macroinstruction to set said indexed reference bit, and to a said write memory access macroinstruction to set said indexed change bit, the output of said reference and change table being connected to said status register for setting particular ones of said status bits in response to the state of said indexed reference and change bits.

2. In a multitasking data processing machine supporting virtual memory comprising a plurality of segments, said data processing machine having
- a central processor including a latch, a memory address register and a memory data register,
- a control store connected to said central processor,
- a bus connected to said central processor, comprising address signal lines receiving address signals from said memory address register, and data signal lines receiving data signals from said memory data register and providing data signals to said memory data register,
- physical memory adapted for storing data signals representative of data and macroinstructions, comprising
  - relatively slow access secondary memory connected to said bus, and providing a plurality of pages, each page containing a plurality of said data signals, and
  - relatively fast access main memory connected to said bus for receiving and providing data signals and receiving address signals, said main memory providing a plurality of page frames each adapted to contain the same plurality of data signals contained by a said secondary memory page, and addressable by physical address signals comprising page frame number signals and offset signals,
- said central processor, control store and bus together providing means for controlling the copying of a page-sized plurality of the data signals of said secondary memory into addressed said main memory page frames and vice versa,
- said data processing machine being adapted to operate responsive to certain of said data signals representative of macroinstructions provided in said physical memory, said central processor and control store together being responsive to signals representative of particular read and write memory access macroinstructions to generate virtual address signals comprising segment number signals, page number signals and offset signals, and to deliver said virtual address signals to said latch,
- said central processor and control store being further responsive to said memory access macroinstructions to perform a translation of said virtual address signals to corresponding physical address signals, said translation comprising the application of said segment number and page number signals to said main memory to address particular portions of main memory containing page frame number signals, and the transmission of said page frame number signals from said main memory, together with said offset signals from said latch, to said memory address register,
- said central processor and control store being further responsive to said read memory access macroinstructions to apply to said memory data register data signals from said addressed main memory page frames, and to said write memory access macroinstructions to apply to said addressed main memory page frames signals from said memory data register, that improvement comprising
- an indexed random access memory within said central processor, having its indexing means connected to certain of the outputs of said latch,
- multiplexer means having its outputs connected to the inputs of said memory address register, and having two sets of inputs, the outputs of said random access memory being connected to the first said set of inputs, the outputs of said latch being connected to the second said set of inputs,
- said central processor and control store together being initially responsive to a said memory access macroinstruction to apply signals representative of said virtual address page number from said latch to said random access memory indexing means to provide at its outputs the set of signals stored at the indexed location, including signals representative of said page frame number and a fault signal having one of two states,
- said multiplexer means being responsive to a first state of said fault signal to transmit the indexed page frame number signals from said random access memory to said memory address register for addressing main memory, and responsive to a second state of the fault signal to transmit the virtual address signals output from said latch to said memory address register for translation,
- said central processor and control store further being responsive to the second state of said fault signal to perform said translation of said virtual address signals and to apply signals representative of said translated page frame number to said indexed location in said random access memory, together with a said fault signal having said first state,
- said data processing machine further providing
- a monitor bit in said main memory associated with each said virtual memory segment, and having either of two states, and
- a stack signal storage means in said central processor,
- said central processor and control means being together responsive to said second state of said fault signal and to said virtual address segment number signals, during said translation of said virtual address, to address the said monitor bit for said segment and to test its state,
- said central processor and control means being responsive to a first said state of said monitor bit to apply said virtual address page number signals to said stack signal storage means for storage,
- said central processor and control means being responsive to a switch of tasks during operation of said machine to retrieve said stored virtual address page number signals from said stack signal storage means and to apply said stored signals to index said random access memory for setting said fault signal to its said second state.

* * * * *